United States Patent
Nguyen

(10) Patent No.: US 9,671,842 B2
(45) Date of Patent: Jun. 6, 2017

(54) CONTROL DEVICE FOR DISTRIBUTED GENERATORS

(71) Applicant: LSIS CO., LTD., Anyang-si, Gyeonggi-do (KR)

(72) Inventor: Khanh-Loc Nguyen, Anyang-si (KR)

(73) Assignee: LSIS CO., LTD., Anyang-si, Gyeonggi (KR)

( * ) Notice: Subject to any disclaimer, the term of this patent is extended or adjusted under 35 U.S.C. 154(b) by 733 days.

(21) Appl. No.: 13/931,420

(22) Filed: Jun. 28, 2013

(65) Prior Publication Data

US 2014/0088778 A1 Mar. 27, 2014

(30) Foreign Application Priority Data

Sep. 27, 2012 (KR) .................. 10-2012-0108031

(51) Int. Cl.
| | | |
|---|---|---|
| *G05D 3/12* | (2006.01) | |
| *G06F 1/26* | (2006.01) | |
| *H02J 3/38* | (2006.01) | |
| *H02J 3/48* | (2006.01) | |

(52) U.S. Cl.
CPC ............... *G06F 1/26* (2013.01); *H02J 3/381* (2013.01); *H02J 3/48* (2013.01)

(58) Field of Classification Search
CPC ..... G06F 1/26; H02J 3/381; H02J 3/48; H02J 3/38
USPC .................. 700/286, 291, 295, 297
See application file for complete search history.

(56) References Cited

U.S. PATENT DOCUMENTS

| | | | | |
|---|---|---|---|---|
| 7,912,589 B2* | 3/2011 | Korba | ............ | G05B 17/02 700/286 |
| 7,957,845 B2* | 6/2011 | Chen | ............ | H02J 3/00 700/14 |
| 2003/0144864 A1* | 7/2003 | Mazzarella | ............ | G06Q 30/018 705/412 |
| 2007/0100506 A1* | 5/2007 | Teichmann | ............ | H02J 3/24 700/297 |
| 2007/0124026 A1* | 5/2007 | Troxell | ............ | G06Q 30/08 700/291 |
| 2010/0157638 A1* | 6/2010 | Naiknaware | ............ | H02M 7/4807 363/131 |

(Continued)

OTHER PUBLICATIONS

Loc et al., "A Study on Active Power and Frequency Response in Mircogrid", IEEE, 2011, 6 pages.*

*Primary Examiner* — Robert Fennema
*Assistant Examiner* — Thomas Stevens
(74) *Attorney, Agent, or Firm* — Lee, Hong, Degerman, Kang & Waimey PC

(57) ABSTRACT

A control device for a plurality of distributed generators connected to a main grid, the control device including a load power measuring unit measuring power consumption of loads connected to the plurality of distributed generators, a distributed generator power measuring unit measuring power output from the plurality of distributed generators, a power flow reference value determining unit determining a power flow reference value of a power line connected to the main grid based on the power consumption and the power output from the plurality of distributed generators, and a mode control unit changing an operation mode of one of the plurality of distributed generators such that a flow power of the power line connected to the main grid maintains the power flow reference value.

16 Claims, 5 Drawing Sheets

(56) References Cited

U.S. PATENT DOCUMENTS

| | | | | |
|---|---|---|---|---|
| 2010/0208501 | A1* | 8/2010 | Matan | H02J 3/18 |
| | | | | 363/95 |
| 2011/0202418 | A1* | 8/2011 | Kempton | B60L 11/1824 |
| | | | | 705/26.1 |
| 2011/0276192 | A1* | 11/2011 | Ropp | H02J 3/383 |
| | | | | 700/293 |
| 2012/0239214 | A1* | 9/2012 | Nakashima | H02J 3/32 |
| | | | | 700/291 |
| 2012/0245744 | A1* | 9/2012 | Prosser | H02J 3/46 |
| | | | | 700/286 |
| 2013/0030590 | A1* | 1/2013 | Prosser | H02J 3/14 |
| | | | | 700/295 |
| 2013/0035802 | A1* | 2/2013 | Khaitan | G06F 1/263 |
| | | | | 700/297 |
| 2014/0067151 | A1* | 3/2014 | Erhart | G05F 1/66 |
| | | | | 700/297 |
| 2014/0350743 | A1* | 11/2014 | Asghari | G05B 13/048 |
| | | | | 700/297 |
| 2014/0354234 | A1* | 12/2014 | Sudan | H02J 7/0063 |
| | | | | 320/127 |
| 2015/0105931 | A1* | 4/2015 | Forbes, Jr. | G06F 1/266 |
| | | | | 700/297 |

\* cited by examiner

CONTROL DEVICE FOR DISTRIBUTED GENERATORS

CROSS-REFERENCE TO RELATED APPLICATIONS

Pursuant to 35 U.S.C. §119(a), this application claims the benefit of earlier filing date and right of priority to Korean Patent Application No. 10-2012-0108031, filed on Sep. 27, 2012, the contents of which is incorporated by reference herein in its entirety.

BACKGROUND

The present disclosure relates to a control device for distributed generators, and more particularly, to a control device for distributed generators, which are connected to a power main grid.

SUMMARY

While power consumption has continuously increased in Republic of Korea, it is difficult to expand generation facilities corresponding to this because construction of thermoelectric power plants and nuclear power plants with large capacitances is limited due to issues, such as security of site, environment, resource supply, etc. Also, as industries highly advance, requirements for quality of power increase too, and thus requirements for development of various energy sources increase, which consider consumption management and control.

Thus, a system for interconnecting distributed generators using renewable energies, such as wind power, solar power, fuel cells, and the like has been developed. A microgrid is a network system comprised of distributed generators that are connected to a main grid, and since the microgrid is operable interconnecting with or independently from the main grid according to the condition of the system, and makes it possible to enhance energy efficiency, reversely transmits power, and enhance reliability through efficient use of distributed generators, the microgrid is in the limelight as the next generation IT technology.

FIG. 1 is a block diagram for explaining a general microgrid system.

Referring to FIG. 1, a microgrid system may include a main grid 10 of a power system, and a microgrid 30 connected to the main grid 10 at a common coupling point 20, and the micro grid 30 may include a plurality of distributed generators 33 which are connected to the main grid 10 lines, and a plurality of loads 32 which are supplied with power from the plurality of distributed generators 33.

Thus, by properly distributing powers fed from the distributed generators 33 and the main grid 10, it is possible to maintain the powers fed to the loads 32. Since a main power supplier supplying power to the main grid 10 may control and regulate power supply on the basis of the micro grid 30, efficient operation becomes possible.

However, in the case the distributed generators 33 are interconnected to the power of the main grid 10, when power consumption of the loads 32 in the microgrid 30 changes, a main power supplier of the main grid 10 fails to control the microgrid 30 in a view of the main grid 10, and thus the output power of the distributed generators 33 may not be utilized to the maximum. To overcome the above-described problem, there is proposed a method in which power flow of the common coupling point 20 is constantly maintained to regard the microgrid 30 as a single load. However, the method has a problem in that when the load 32 consumes the maximum power, the output of the distributed generators 33 is not fluid for maintenance of the power flow but is limited.

Besides, in the case where the microgrid 30 is disconnected to the main grid 10 and is converted to an independent system, the distributed generators 33 that operate respectively have to change local frequencies so as to maintain the power flow. In this regard, when the change width of frequency is large, unnecessary power consumption is caused, resulting in the instability of the entire system.

DETAILED DESCRIPTION OF THE EMBODIMENTS

Figure 1:
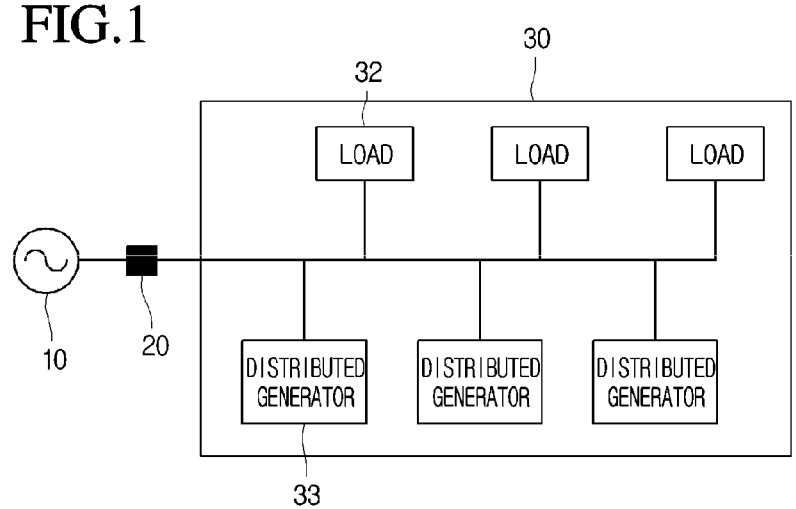
FIG. 1 is a block diagram for explaining a general microgrid system.

Embodiments provide a control device for distributed generators that may stably operate a microgrid system.

Embodiments also provide a control device for distributed generators that may efficiently control the power of distributed generators even when the state of a load and the operation mode are changed.

According to the embodiments, the control device for distributed generators may change the operation mode of at least one of a plurality of distributed generators so as to the power flow of a main grid connection power line.

In particular, by determining a power reference value of power flow based on power consumption and output powers of distributed generators, the frequency fluctuation width according to the operation mode conversion may be decreased and the microgrid system may be stably maintained.

Further, since the power reference value of the power flow may be determined and thus the operation mode of the plurality of distributed generators may be fluidly changed, although the state of a load and the operation mode are changed, the outputs of the distributed generators may be efficiently controlled.

Hereinafter, fundamentals of the invention will be exemplarily described. Therefore, those skilled in the art may embody the fundamentals of the invention and invent various apparatuses having the concepts and scope of the present invention although the fundamentals of the present invention are not clearly described or illustrated in the specification.

Conditional terms and embodiments in the specification are only intended to describe concepts of the invention, and it should not be understood that the invention is limited by the conditional terms and embodiments.

Also, it should be understood that all of descriptions of fundamentals, aspects, embodiments of the present invention, and a certain embodiment are intended to include structural and functional equivalents thereof. Furthermore, it should be understood that such equivalents include not only well-known equivalents but also all equivalents that will be invented to perform the same function regardless of a structure thereof.

Therefore, it should be understood that a block diagram of the specification shows conceptual aspects of an exemplary circuit for embodying fundamentals of the present invention. Similarly, it should be understood that all flowcharts, state transition diagrams, pseudo codes may substantially represent computer-readable medium, and various processes performed by a computer or a processor although the computer or the processor is not clearly illustrated.

Functions of various devices shown in a drawing including functional blocks shown as processors or similar concepts may be provided not only using dedicated hardware but also using hardware capable of performing predetermined software. When the functions are provided by a processor, the functions may be provided by a single dedicated processor, a single shared processor, or a plurality of individual processors, some of which may be shared.

Terms used for a processor, control, or similar concepts may not be understood to exclusively citing hardware capable of performing software, and they may be understood to suggestively include a digital signal processor (DSP) hardware, a read only memory (ROM), a random access memory (RAM), and non-volatile memory for storing software without limitation. Other hardware well known may be included.

In claims, constituent elements expressed as means for performing functions described in the specification are intended to include combination of circuit devices for performing the functions and all methods performing the functions including all types of software having firmware/micro codes. Also, the constituent elements are connected to a proper circuit for performing the software to perform the functions. Any means providing the functions should be understood as an equivalent to that understood from the specification because the present invention defined by the claims is a combination of functions provided by the diverse means and methods described in the claims.

The advantages, features and aspects of the invention will become apparent from the following description of the embodiments with reference to the accompanying drawings, which is set forth hereinafter. Therefore, those skilled in the art may easily embody technical aspects of the invention. Moreover, detailed descriptions related to well-known functions or configurations will be ruled out in order not to unnecessarily obscure subject matters of the present invention.

Hereinafter, a preferred embodiment will be described in detail with reference to the accompanying drawings.

Figure 2:
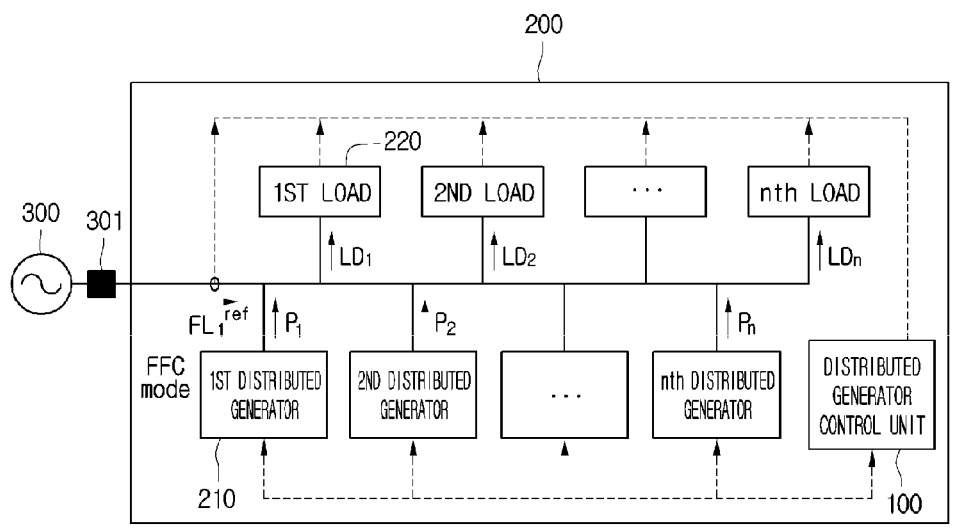
FIG. 2 is a block diagram for explaining a power system including a control device for distributed generators according to an embodiment.

FIG. 2 is a block diagram for explaining a power system including a control device for distributed generators according to an embodiment.

Referring to FIG. 2, a power system including a control device 100 for distributed generators according to an embodiment includes a main grid 300, and a microgrid 200 connected at a common coupling point 301 to the main grid 300, and the micro grid 200 includes a plurality of distributed generators 210, a plurality of loads 220, and the control device 100 for distributed generators controlling operations of the plurality of distributed generators 210 and the plurality of loads 220.

The main grid 300 functions as a main power supply part, and supplies electrical power delivered via a power system from a main power supplier to the microgrid 200. At this time, a point connecting the microgrid 200 and the main grid 300 may be referred to as the common coupling point 301.

A flow power flowing through a line directed toward the direction of the microgrid 200 may be referred to as a feeder flow (FL), and it may be seen from FIG. 2 that when the operation mode of the first distributed generator 210 is a feeder flow control (FFC) mode, the power reference value is controlled to a value of EL1ref. Concrete operation modes of the distributed generators 210 will be described later.

The microgrid 200 may supply load power consumptions D1 to LDn which are needed for the respective loads 220 according to the power received from the external main grid 300 and the powers P1 to Pn supplied by the internal distributed generators 210.

And, the control device 100 for distributed generators may be connected to the respective distributed generators 210 and the respective loads 220. The control device 100 for distributed generators may measure the power consumption of each of the loads 220, the output of each of the distributed generators 210, determine the reference value of a line of the common coupling point 301 connected to the main grid 300 based on the measured power consumption and the measured output of each of the distributed generators, and change the operation mode of at least one of the plurality of distributed generators such that the flow power of the line of the common coupling point 301 maintains the determined reference value. For example, as illustrated in FIG. 2, the control device 100 for distributed generators controls the operation mode of the first distributed generator 210 to be the feeder flow control (FFC) mode such that the power inputted from the main grid becomes the reference value FL1ref.

Figure 3:
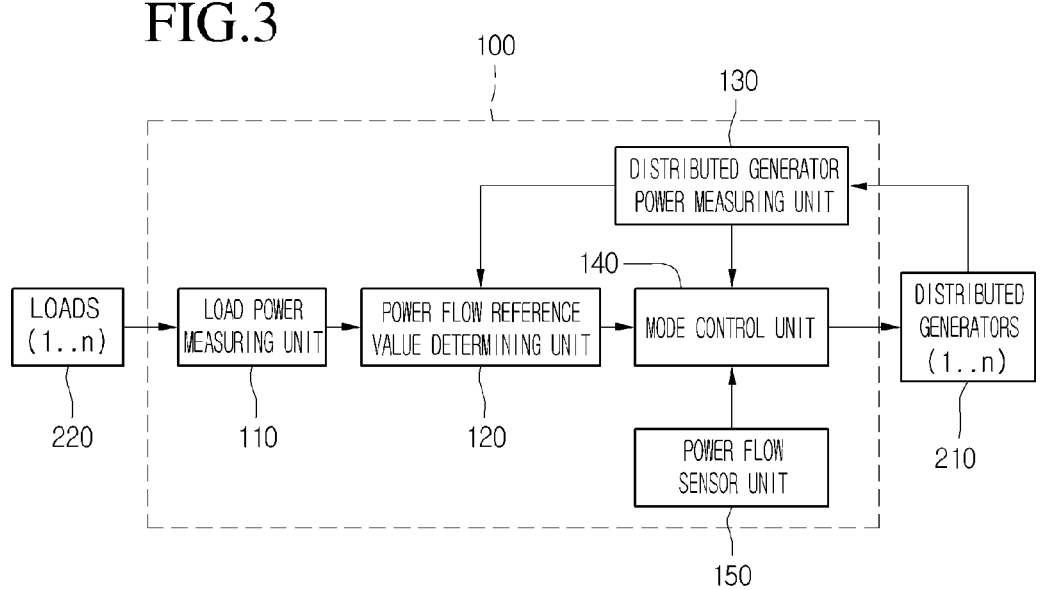
FIG. 3 is a detailed block diagram of a control device 100 for distributed generators according to an embodiment.

FIG. 3 is a detailed block diagram of a control device 100 for distributed generators according to an embodiment.

Referring to FIG. 3, a control device 100 for distributed generators according to an embodiment includes a load power measuring unit 110 connected to the respective loads 220 to measure power consumption of the loads, a distributed generator power measuring unit 130 connected to the respective distributed generators 210 to measure output powers of the distributed generators 210, a power flow reference value determining unit 120 determining the reference value of the power flow directed toward the common coupling point 301 connected to the main grid based on the measured load power consumption and the measured distributed generator output power, a power flow sensor unit 150 measuring the power of the power flow, and a mode control unit 140 converting the operation mode of at least one of the distributed generators 210 based on the measured power flow value, the measured distributed generator output, and the power flow reference value.

The load power measuring unit 110 may be connected to the plurality of loads 220 to measure the load power consumption which is consumed by the connected load 220. Also, the load power measuring unit 110 may calculate the maximum power consumption of each of the loads 220. For example, the load power measuring unit 110 may calculate the current maximum power consumption by adding up the power consumption values of all the connected loads 220.

Again referring to FIG. 2, the load power measuring unit 110 may measure power consumption LD1 to LDn of the loads 220, and calculate and output the maximum power consumption by adding up LD1 to LDn.

Again referring to FIG. 3, the distributed generator power measuring unit 130 may be connected to the plurality of distributed generators 210 to measure the output powers of the connected distributed generators 210.

The distributed generator power measuring unit 130 may measure current and voltage values outputted from the respective distributed generators 210 and perform an arithmetic operation of the output powers of the distributed generators 210. The distributed generators 210 may have different outputs according to the type and operation mode thereof. Therefore, the distributed generator power measuring unit 130 may communicate with other measuring devices or the distributed generators 210 to identify the type and the operation mode of each of the distributed generators 210 and measure the output of each of the distributed generators 210.

Also, the distributed generators power measuring unit 130 may measure the output powers of all the distributed generators 210 and perform an arithmetic operation on all the output values of the distributed generators 210.

And, the distributed generator power measuring unit 130 may separately measure a first output power of the distributed generators 210 operating in a first mode, and a second output power of the distributed generators 220 operating in a second mode, and deliver the first output power and the second output power to the mode control unit 140.

The power flow reference value determining unit 120 determines a reference value for a power flow directed toward the common coupling point 301 connected to the main grid 300 based on the load power consumption measured by the load power measuring unit 110 and the distributed generator output power measured by the distributed generator power measuring unit 130.

Herein, the power flow reference value may be determined to be a value obtained by subtracting a total sum of the distributed generator output powers from a total sum of the power consumption. A detailed arithmetic method will be described later.

The power flow sensor unit 150 measures the power flow and delivers the measured power flow to the mode control unit 140.

The mode control unit 140 changes the operation mode of at least one of the distributed generators 210 based on the power flow value measured by the power flow sensor unit 150, the distributed generator power measured by the distributed generator power measuring unit 130, and the power flow reference value determined by the power flow reference value determining unit 120 such that the flow power of the line connected to the main grid maintains the reference value.

For example, the mode control unit 140 may change the operation mode to a first mode in which each of the distributed generators 210 constantly maintains the power flow of a line connected to the main grid or a second mode in which the output power of each of the distributed generators is maintained constantly and perform a control such that the flow power of the line connected to the main grid maintains the power flow reference value.

Hereinafter, operations and effects of the mode control unit 140 configured thus will be described in more detail with reference to FIGS. 4 through 9.

Figure 4:
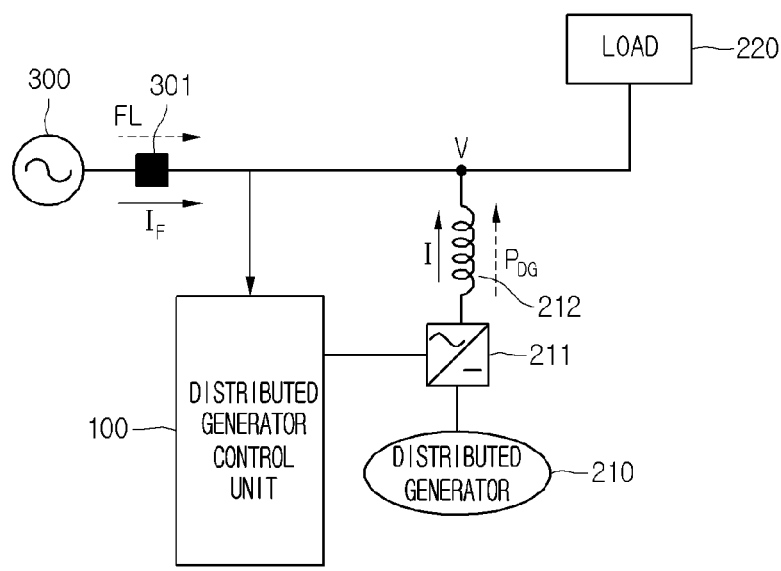
FIG. 4 is a schematic view for partially explaining a microgrid system which is operated by a control device 100 for distributed generators according to an embodiment.

FIG. 4 is a schematic view for partially explaining a microgrid system which is operated by a control device 100 for distributed generators according to an embodiment.

Referring to FIG. 4, the control device 100 for distributed generators may control the distributed generator 210 such that the distributed generator 210 operates in the first mode or the second mode by an operation of the above-described mode control unit 140.

The first mode may be a feeder flow control (FFC) mode in which the flow of the power line directed toward the direction of the distributed generator 210 is constantly maintained at the common coupling point that is the power line connected to the main grid.

In other words, the first mode may be the FFC mode that constantly maintains the power flow at a terminal previous to the distributed generator 210. When the distributed generator 210 operates in the FFC mode, the distributed generator 210 may regulate power PDG thereof depending on variations in power consumption. Thus, the power flow FL from the main grid 300 connected to the distributed generator 210 may be constantly maintained. Therefore, since a main power supplier which supplies power to the main grid may control the microgrid itself including the distributed generator 210 as a load consuming a constant power, it is possible to easily measure and control power supplied to the microgrid.

Figure 5:
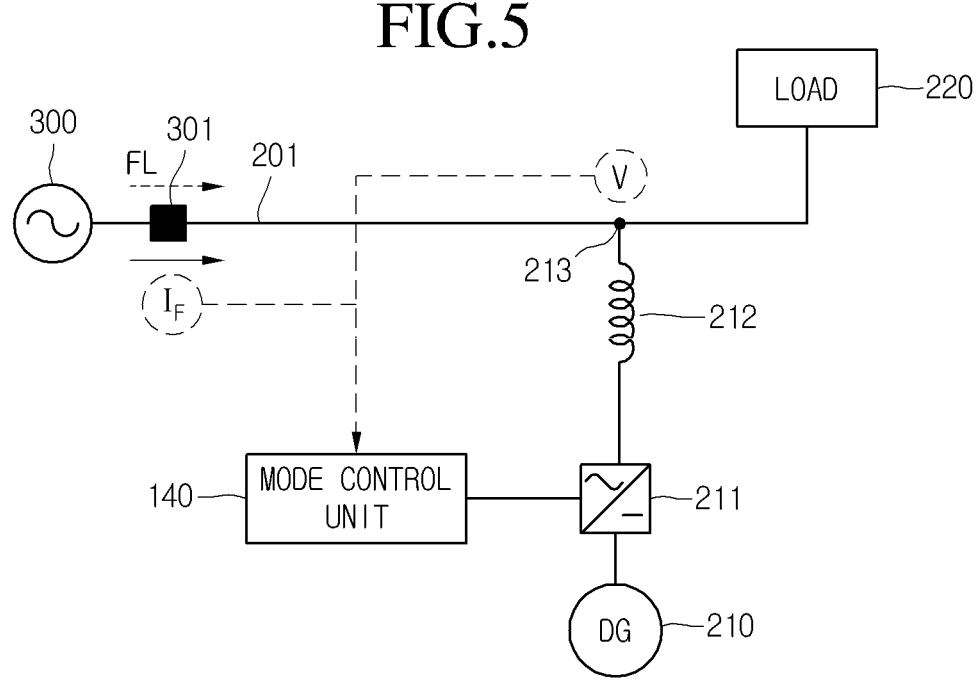
FIGS. 5 and 6 are schematic views for more concretely explaining that distributed generators operate in an FFC mode.
Figure 6:
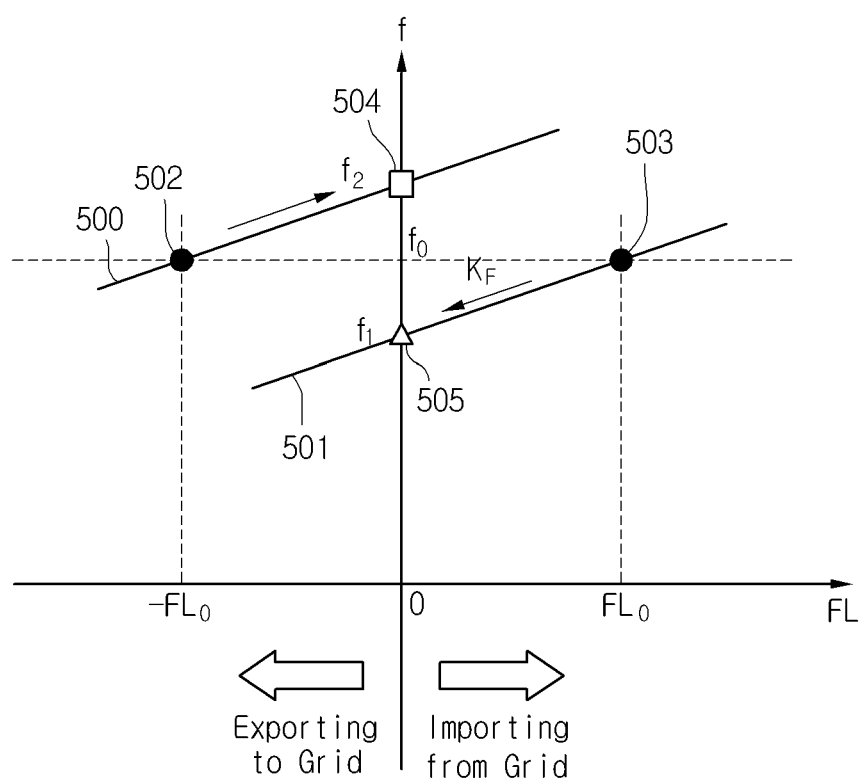

FIGS. 5 and 6 are schematic views for more concretely explaining that a distributed generator operates in an FFC mode.

For example, as illustrated in FIG. 5, the distributed generator 210 may be connected to an inverter 211, the inverter 211 may be connected to the mode control unit 140 and an inductor 212, and the inductor 212 may be connected to the point 300 of common coupling and a load 220.

The mode control unit 140 may operate the corresponding distributed generator 210 in the FFC mode, and at this time, the mode control unit 140 may measure voltage V and current IF, calculate feeder flow (FL) based on the measured voltage V and current IF, and may control output power Pdg of the distributed generator 210 via the inverter 211 such that FL is maintained.

Thus, as described above, FL that is the power flow of a previous terminal to the distributed generator 210 may be constantly maintained, and it is made easy to measure the load power of the main power supplier and control the power consumption.

Meanwhile, FIG. 6 is a graph showing droop characteristics when the distributed generator operates in the FFC mode.

Referring to FIG. 6, in the FFC mode, it may be understood that power flow FL varies with power frequency f.

A first line 500 and a second line 501 are graphs (power import and power export graphs) indicating operation points according to frequency variation, and may have a predetermined slope KF according to the droop characteristics of the FFC mode.

When the distributed generator 210 operates in the FFC mode, the distributed generator 210 may maintain the power flow at $FL_0$ (importing from Grid) or $-FL_0$ (exporting to Grid) with respect to reference frequency $f_0$ in a state that the distributed generator 210 is disconnected to the main grid 300. At this time, the operation points may be said to be point 502 and point 503.

However, when the distributed generator 210 is separated from the main grid 300, the distributed generator 210 should be changed to the independent operation mode. At this time, since the distributed generator 210 is disconnected to the main grid, FL should be zero (0), and since the input of power into or the output of power from the load should be maintained, power frequency should be changed and thus the operation points should be changed too.

For example, if the power flow is $FL_0$ (importing from Grid) when the distributed generator 210 is separated from the main grid, the power frequency may be changed from $f_0$ to $f_1$ in the decreasing direction. Thus, operation point 503 of the distributed generator 210 may be changed to operation point 505.

Also, for example, if the power flow is $-FL_0$ (exporting from Grid) when the distributed generator 210 is separated from the main grid, the power frequency may be changed from $f_0$ to $f_2$ in the increasing direction. Thus, operation point 502 of the distributed generator 210 may be changed to operation point 504.

Thus, when power frequency is changed in the FFC mode, an increase or decrease of frequency or change of operation point may occur. The change of frequency may cause power loss and system instability.

To solve the above-described problems, the control device 100 for distributed generators may decrease the change of frequency by constantly maintaining the flow power at a specific value. Detailed operations will be described later.

Meanwhile, the control device 100 for distributed generators may control the distributed generator 210 such that the distributed generator 210 operates in the second mode by an operation of the above-described mode control unit 140. In an embodiment, the second mode may be a unit power control (UPC) mode that constantly maintains the output power of the distributed generator 210. In the case of UPC mode, the control device 100 for distributed generators may constantly maintain the output of the distributed generator 210 itself at a specific value regardless of the amount of power flow.

Figure 7:
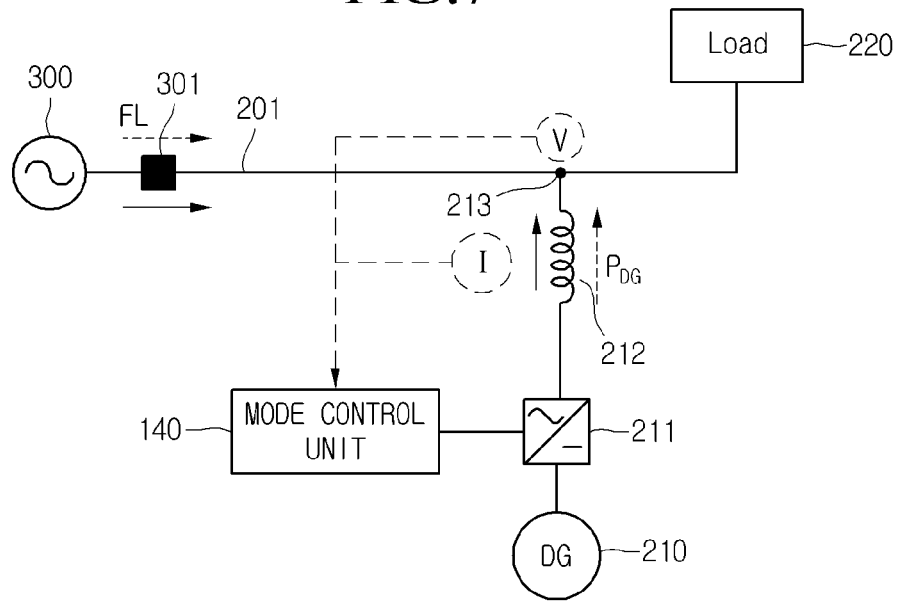
FIGS. 7 and 8 are schematic views for more concretely explaining that distributed generators operate in a UPC mode.
Figure 8:
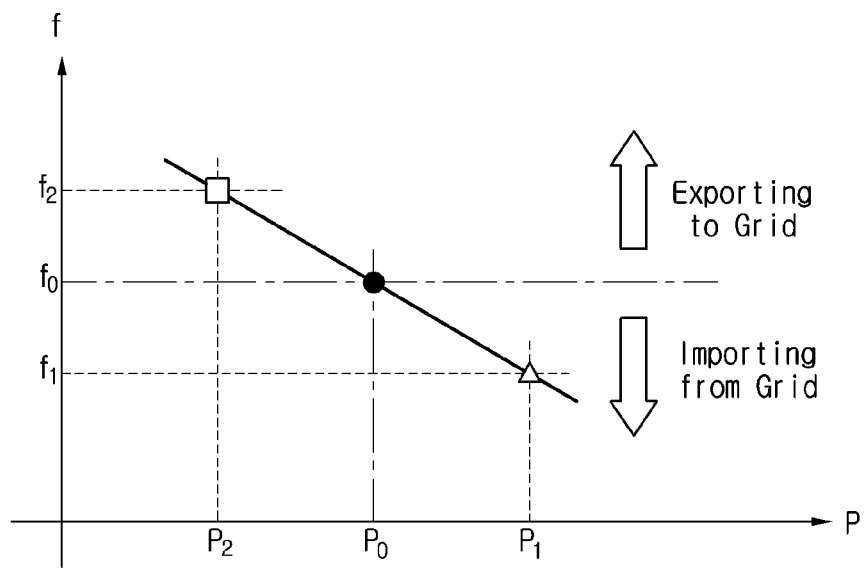

FIGS. 7 and 8 are schematic views for more concretely explaining that a distributed generator operates in the UPC mode.

As illustrated in FIG. 7, the mode control unit 140 of the control device 100 for distributed generators may operation the distributed generator 210 in the UPC mode.

For example, the control device 100 for distributed generators may control an inverter 211 connected to a distributed generator 210 such that power Pdg that is a product of current I flowing through an inductor 212 connected to an output terminal of the inverter 211, and voltage V is constantly maintained.

In the case of the UPC mode, the control device 100 for distributed generators may control the distributed generator 210 such that a constant output is fed from the distributed generator 210 regardless of the load variation circumstance of the microgrid.

FIG. 8 is a graph showing droop characteristics of output power depending on frequency of the distributed generator 210 operating in the UPC mode.

As shown in FIG. 8, when the output power P of the distributed generator operating in the UPC mode is connected to the main grid, power may be constantly maintained at P0 with respect to reference frequency $f_0$.

However, when the distributed generator 210 is separated from the main grid 300, the distributed generator 210 should be changed to the independent operation mode. At this time, while the distributed generator 210 is disconnected to the main grid, power, since input into or output from the load should be maintained, power frequency should be changed and thus may be changed to P1 (importing from grid) or P2 (exporting to grid).

Thus, the output power frequency of the distributed generator 210 may be also changed to $f_1$ or $f_2$, and thus power loss and system instability may be caused. Therefore, in the independent operation in which the distributed generator is separated from the main grid, the control device 100 for distributed generators may operate the distributed generator 210 first connected to the power line of the main grid in the FFC mode to thus decrease frequency change caused by the distributed generator 210 operating in the UPC mode. Detailed operations will be described later.

As described above, in the case of the FFC mode, it is made easy to measure and control power consumption of the main power supplier with respect to the main grid. However, the FFC mode has problems in that the output of the distributed generator 210 seriously varies with the change of load so as to maintain the power flow and it is difficult to control the output change.

On the other hand, in the case of the above-described UPC mode, since the output of the distributed generator 210 is limited to a specific value, the output may not be used to the maximum, and the main power supplier to the main grid may fail to predict power supply or control power.

Therefore, according to embodiments of the present invention, the mode control unit 140 may control the distributed generator 210, which is first connected to the main grid connection power line, to operate in the FFC mode, allow the flow power supplied from the main grid to maintain a specific reference value, and change the operation mode of at least one of the distributed generators 210 to the UPC or FFC mode, thus controlling the powers of the distributed generators 210 supplied to the loads.

The mode control unit 140 may control the first distributed generator, which is first connected to the main grid connection power line, for example, is directly connected to the point 301 of common coupling, in the FFC mode. Thus, it is made possible that the load change does not occur in the viewpoint of the main grid 300. The mode control unit 140 may elastically regulate the entire powers in the microgrid 200 by controlling a plurality of second to nth distributed generators in the UPC or FFC mode.

Meanwhile, in an embodiment, the mode control unit 140 may change the mode of at least one distributed generator operating in the FFC mode to the UPC mode, or change the mode of at least one distributed generator operating in the UPC mode to the FFC mode.

For example, when the power flow measured by the power flow sensor unit 150 and delivered from the point 301 of common coupling is greater than the power flow reference value, the mode control unit 140 may change the mode of at least one distributed generator operating in the UPC mode to the FFC mode so as to again control the power flow to be close to the power flow reference value. Thus, the power flow may be maintained at the power flow reference value, and thus power frequency may be maintained at a specific frequency.

Therefore, in the case that the mode control unit 140 controls the power flow at a frequency lower than the maximum operation frequency, when the distributed generator is disconnected to the main grid and is converted to the independent operation, the frequency change width may be decreased. To maximize these effects and maintain the output of the distributed generator, the power flow reference value may be determined as follows.

$$FL_1^{ref} = LD^{max} - \left( \sum_{i \in FFC} P_i^{max} + \sum_{j \in UPC} P_j^{max} \right) \quad \text{[Equation 1]}$$

where $FL_1^{ref}$ is a power flow reference value, $LD_{max}$ may indicate a total sum of load power consumption, and P may indicate an output power of a distributed generator.

As expressed by Equation 1, the power flow reference value may be calculated by subtracting the total sum of the output powers of the distributed generators from the total sum of the power consumption. The output power of the distributed generator may be obtained by operating the total sum of the maximum output powers of the distributed generators in the FFC mode and the total sum of the maximum output powers of the distributed generators in the UPC mode.

The decrease in frequency change according to the power flow reference value may be described with reference to FIG. 9.

Figure 9:
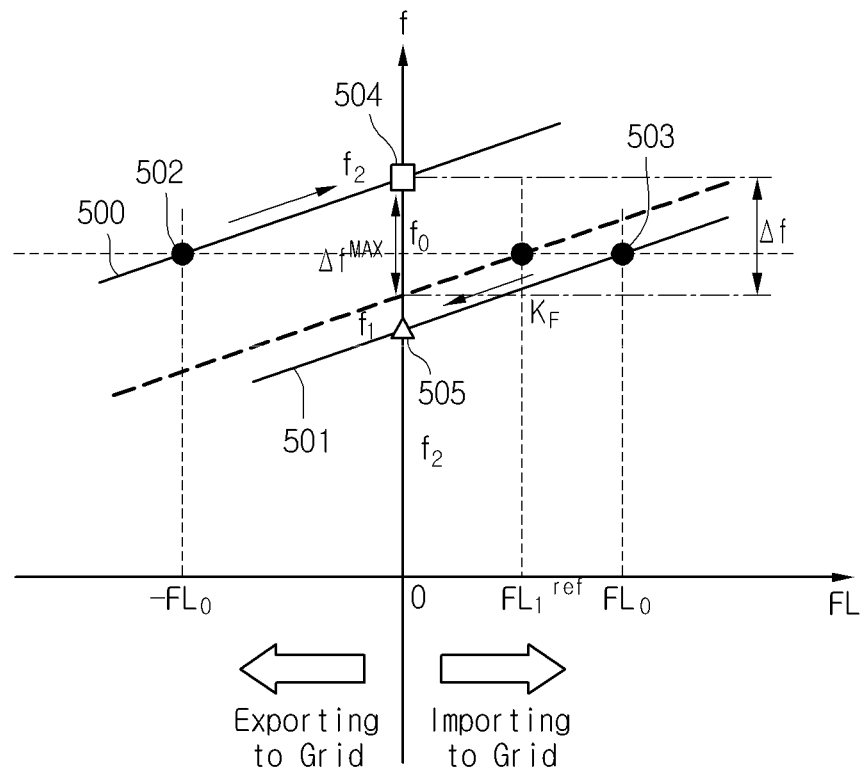
FIG. 9 is a graph for explaining a change in drooping characteristics of distributed generators which are controlled according to an embodiment.

FIG. 9 is a graph for explaining a change in droop characteristics of distributed generators which are controlled according to an embodiment.

As shown in FIG. 9, the mode control unit 140 may control the size of the power flow to be FL1ref while operating the first distributed generator which is first connected to the main grid, in the FFC mode. FL1ref may be determined by the above-described power flow reference value determining unit 120 or the mode control unit 140. According to the control of the mode control unit 140, the droop characteristic graph of the system may be determined like a dotted line.

In this case, the flow power of the power line having reference frequency f0 when the power line is connected to the main grid may be controlled to be $FL_1^{ref}$. At this time, $FL_1^{ref}$ may preferably have a value less than the maximum flow power of the power line. As the value of $FL_1^{ref}$ decreases, in a case where the distributed generator is disconnected to the main grid, the change of frequency may be decreased. Thus, the power flow reference value may have a value less than a specific value, for example, 0.5 Hz. The maximum value of power flow reference value may be calculated by Equation 2.

$$FL_1^{max} = \frac{\Delta f^{max}}{K_F} \quad \text{[Equation 2]}$$

where $FL_1^{max}$ indicates a maximum value of power flow reference value, the amount of change of maximum frequency ($\Delta f_{max}$) may indicate a value obtained by subtracting importing operation frequency $f_1$ from exporting operation frequency $f_2$ of the droop characteristic graph of the first distributed generator, and $K_F$ may indicate a slope coefficient of the droop characteristic graph of the first distributed generator itself. Thus, since the maximum value of power flow reference value is limited, the rate of change of frequency may be decreased when the distributed generator is disconnected to the main grid.

Meanwhile, the following conclusion may be induced from Equations 1 and 2.

$$K_F \le \frac{FL_1^{ref}}{\Delta f^{max}} \quad \text{[Equation 3]}$$

As expressed by Equation 3, it may be understood that a value obtained by dividing the power flow reference value by the rate of change of maximum frequency should be greater than the slope coefficient KF of the droop characteristic graph of the first distributed generator itself.

Therefore, when the determined reference value exceeds the maximum value, the power flow reference value determining unit 120 may change the reference value to the maximum value based on the slope coefficient of the droop characteristic graph of the first distributed generator itself, thus maintaining the decreasing effect of frequency change amount when the distributed generator is separated from the main grid. This decreasing effect may be confirmed from FIG. 9 in which $\Delta f$ is less than $\Delta f^{max}$.

Meanwhile, as described above, the mode control unit 140 may change the operation mode of at least one distributed generator operating in the UPC mode to the FFC mode until the flow power of the power line connected to the main grid is not more than the reference value. An abrupt change of power flow may occur due to the change of the mode. Frequent change of the power flow may cause the system to be instable. Thus, a sequential mode change of the hysteresis manner may be needed.

Thus, according to embodiments, when the flow power of the power line connected to the main grid exceeds the reference value, the mode control unit 140 may sequentially change the operation mode of the plurality of distributed generators to the first mode according to the sequence of the power lines connected to the main grid, thus maintaining the flow power of the power line connected to the main grid at the reference value without any change.

More specifically, while the mode control unit 140 controls the first distributed generator to operate in the FFC mode, when the flow power of the power line connected to the main grid exceeds the reference value, it may be determined whether or not the second distributed generator connected secondly to the main grid operates in the UPC mode.

When the second distributed generator operates in the UPC mode, the mode control unit 140 may change the operation mode of the second distributed generator to the FFC mode.

Thereafter, while the second distributed generator operates in the FFC mode or the operation mode thereof has been changed to the FFC mode, when the flow power of the power line still exceeds the reference value, the same determination and mode change as those to the second distributed generator may be performed with respect to the third distributed generator.

The change of flow power may be decreased by the sequential mode change, and the maximum output of the distributed generator according to the change of load may be maintained.

Meanwhile, in an embodiment, when load power consumption exceeds the maximum output of the first distributed generator, the mode control unit 140 may again change the UPC mode of at least one distributed generator to the FFC mode. Although the output of the distributed generator in the UPC mode is limited to a specific value, since the output of the distributed generator in the FFC mode may vary with the load, the mode control unit 140 may change the operation mode of the distributed generator in the UPC mode among the distributed generators other than the first distributed generator to the FFC mode such that the maximum output of the microgrid may be maintained. Therefore, a rapid response according to a change of the load may be performed to induce the maximum output of the distributed generators.

Figure 10:
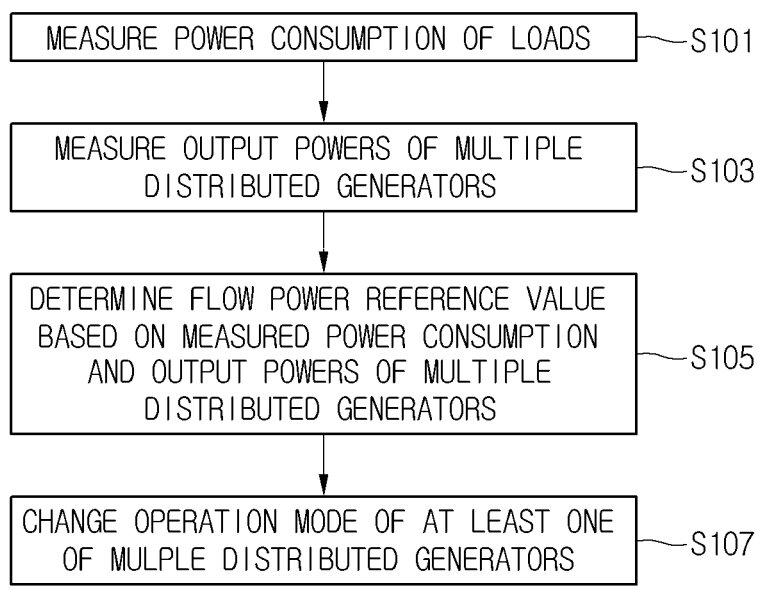
FIG. 10 is a flow diagram for explaining a method for controlling distributed generators according to an embodiment.

FIG. 10 is a flow diagram for explaining a method for controlling distributed generators according to an embodiment.

Hereinafter, the content of FIG. 10 according to an embodiment will be described with reference to FIGS. 2 through 9. Detailed description on the same elements as those in descriptions related to FIGS. 2 through 9 will be omitted.

The load power measuring unit 110 measures power consumption of loads connected to the plurality of distributed generators 210 (S101). The load power measuring unit 110 may also calculate the maximum power consumption of each load 220. For example, the load power measuring unit 110 may calculate the current maximum power consumption by adding up a total power consumption of all the connected loads 220.

The distributed generators 210 may have different outputs according to the type and operation mode. Therefore, the distributed generator power measuring unit 130 may identify the types and operation modes of the distributed generators 210 by communicating with other measuring devices or the distributed generators 210, and may measure the output of each of the distributed generators 210.

The distributed generator power measuring unit 130 measures powers outputted from the plurality of distributed generators 210 (S103). The distributed generators 210 may have different outputs according to the type and operation mode. Therefore, the distributed generator power measuring unit 130 may identify the types and operation modes of the distributed generators 210 by communicating with other measuring devices or the distributed generators 210, and may measure the output of each of the distributed generators 210.

The power flow reference value determining unit 120 determines the flow power reference value of the power line connected to the main grid based on the measured power consumption of the loads and the output power of the plurality of distributed generators 210 (S105). Herein, the power flow reference value may be determined to be a value obtained by subtracting a total sum of the distributed generator output powers from a total sum of the power consumption.

The mode control unit 140 changes the operation mode of at least one of the plurality of distributed generators 210 such that the flow power of the power line connected to the main grid maintains the reference value (S107). For example, the mode control unit 140 may change the operation mode to a first mode in which each of the distributed generators 210 constantly maintains the power flow of a line connected to the main grid or a second mode in which the output power of each of the distributed generators is maintained constantly and perform a control such that the flow power of the line connected to the main grid maintains the power flow reference value.

According to the above-described embodiments, in a microgrid system using inverter-based distributed generators, while the microgrid is operated using a load controllable by the main grid by controlling the mode of the distributed generators, it is possible to control the microgrid system to have the maximum power efficiency according to the change of load. Also, as described previously, it is possible to decrease the change amount of operation frequency in connection or disconnection to the main grid. Further, the power flow reference value may be limited so as to decrease the changed amount of operation frequency.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A control device for a plurality of distributed generators connected to a main grid, the control device comprising:
   a load power measuring unit measuring power consumption of loads connected to the plurality of distributed generators;
   a distributed generator power measuring unit measuring power output from the plurality of distributed generators;
   a power flow reference value determining unit determining a power flow reference value of a power line connected to the main grid based on the power consumption and the power output from the plurality of distributed generators; and
   a mode control unit changing an operation mode of at least one of the plurality of distributed generators such that a flow power of the power line connected to the main grid maintains the power flow reference value,
   wherein the plurality of distributed generators operate in a first mode in which the flow power of the power line is constantly maintained, or in a second mode in which the power output from the plurality of distributed generators are constantly maintained, and
   wherein, when the determined power flow reference value exceeds a maximum value, the power flow reference value determining unit changes the power flow reference value to the maximum value.

2. The control device of claim 1, wherein the power flow reference value determining unit determines, as the power flow reference value, a value obtained by subtracting a total sum of the power output from the plurality of distributed generators from a total sum of the power consumption.

3. The control device of claim 1, wherein the mode control unit changes the operation mode of at least one of the plurality of distributed generators operating in the second mode to the first mode when the flow power of the power line connected to the main grid exceeds the reference value.

4. The control device of claim 1, wherein the mode control unit sequentially changes the operation mode of at least one of the plurality of distributed generators operating in the second mode to the first mode until the flow power of the power line connected to the main grid is not more than the power flow reference value.

5. The control device of claim 1, wherein the mode control unit maintains a first distributed generator, which is first connected to the power line connected to the main grid at the first mode.

6. The control device of claim 1, wherein, when the flow power of the power line connected to the main grid exceeds the power flow reference value, the mode control unit sequentially changes the operation mode of the plurality of distributed generators to the first mode according to the sequence of the plurality of distributed generators connected to the power line connected to the main grid to maintain the flow power of the power line connected to the main grid connection power line at the reference value.

7. The control device of claim 1, wherein the maximum value is determined by a coefficient of a droop characteristic graph when a first distributed generator which is first connected to the power line connected to the main grid operates in the first mode.

8. The control device of claim 1, wherein the mode control unit changes the operation mode of at least one of the plurality of distributed generators other than a first distributed generator to the first mode when it is determined that the total sum of the power consumption of the loads exceeds the total sum of the power output from the plurality of distributed generators.

9. The control device of claim 8, wherein the mode control unit sequentially changes the operation mode of the plurality of distributed generators to the first mode according to the sequence of the plurality of distributed generators connected to the power line connected to the main grid until the total sum of the power consumption of the loads is not more than the total sum of the power output from the plurality of distributed generators.

10. A control method of a control device for controlling a plurality of distributed generators connected to a main grid, the control method comprising:
   measuring, by the control device, power consumption of loads connected to the plurality of distributed generators;
   measuring, by the control device, power output from the plurality of distributed generators;
   determining, by the control device, a power flow reference value of a power line connected to the main grid based on the power consumption and the power output from the plurality of distributed generators; and
   changing, by the control device, an operation mode of at least one of the plurality of distributed generators such that a flow power of the power line connected to the main grid maintains the power flow reference value,
   wherein the operation mode comprises either a first mode in which the flow power of the power line connected to the main grid is constantly maintained, or a second mode in which the power output from the plurality of distributed generators are constantly maintained, and
   wherein the determining of the power flow reference value of the power line comprises changing the power flow reference value to a maximum value when the determined power flow reference value exceeds the maximum value.

11. The control method of claim 10, wherein the determining of the power flow reference value of the power line comprises determining, as the power flow reference value, a value obtained by subtracting a total sum of the power output from the plurality of distributed generators from a total sum of the power consumption.

12. The control method of claim 10, wherein the changing of the operation mode comprises changing the operation mode of at least one of the plurality of distributed generators operating in the second mode to the first mode when the flow power of the power line connected to the main grid exceeds the power flow reference value.

13. The control method of claim 10, wherein the changing of the operation mode comprises
   sequentially changing the operation mode of at least one of the plurality of distributed generators operating in the second mode to the first mode until the flow power of the power line connected to the main grid is not more than the power flow reference value.

14. The control method of claim 10, wherein the changing of the operation mode comprises maintaining a first distributed generator, which is first connected to power line connected to the main grid at the first mode.

15. The control method of claim 10, wherein the changing of the operation mode comprises, when the flow power of the power line connected to the main grid exceeds the power flow reference value, sequentially changing the operation mode of the plurality of distributed generators to the first mode according to the sequence of the plurality of distributed generators connected to the power line to maintain the flow power of a main grid connection power line at the power flow reference value.

16. The control method of claim 10, wherein the maximum value is determined by a coefficient of a droop characteristic graph when a first distributed generator which is first connected to the power line connected to the main grid operates in the first mode.

* * * * *